US010984258B2

(12) United States Patent
Yoshikawa et al.

(10) Patent No.: US 10,984,258 B2
(45) Date of Patent: Apr. 20, 2021

(54) VEHICLE TRAVELING ENVIRONMENT DETECTING APPARATUS AND VEHICLE TRAVELING CONTROLLING SYSTEM (71) Applicant: SUBARU CORPORATION, Tokyo (JP)

(72) Inventors: Hikaru Yoshikawa, Tokyo (JP); Masatoshi Minakawa, Tokyo (JP); Shota Yoshimura, Tokyo (JP); Kazuki Takahashi, Tokyo (JP); Keisuke Motegi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 51 days.

(21) Appl. No.: 16/450,158

(22) Filed: Jun. 24, 2019

(65) Prior Publication Data
US 2020/0104604 A1 Apr. 2, 2020

(30) Foreign Application Priority Data

Sep. 27, 2018 (JP) .............................. JP2018-182786

(51) Int. Cl.
*G06K 9/00* (2006.01)
*G05D 1/02* (2020.01)
(Continued)

(52) U.S. Cl.
CPC .......... *G06K 9/00791* (2013.01); *B60R 11/04* (2013.01); *G05D 1/0251* (2013.01);
(Continued)

(58) Field of Classification Search
None
See application file for complete search history.

(56) References Cited

U.S. PATENT DOCUMENTS 5,530,420 A 6/1996 Tsuchiya et al.
9,103,671 B1 \* 8/2015 Breed .................. G01S 13/931
(Continued)

FOREIGN PATENT DOCUMENTS

JP 07-192199 A 7/1995
JP 2018-013985 A 1/2018

OTHER PUBLICATIONS

J. Kallwies et al., "Effective Combination of Vertical and Horizontal Stereo Vision", IEEE Winter Conference on Applications of Computer Vision, IEEE, May 7, 2018, vol. 2018, No. WACV, pp. 1992-2000.

(Continued)

*Primary Examiner* — Fayyaz Alam
(74) *Attorney, Agent, or Firm* — McDermott Will & Emery LLP (57) ABSTRACT A vehicle traveling environment detecting apparatus includes first to third stereo cameras, first to third image processors, and an image controller. The first stereo camera includes first and second cameras. The second stereo camera includes the first camera and a third camera. The third stereo camera includes the second camera and a fourth camera. The first to third image processors are configured to perform stereo image processing on first to third outside images and thereby determine first to third image processing information including first to third distance information, respectively. The first to third outside images are configured to be obtained through imaging of an environment outside the vehicle by the first to third stereo cameras, respectively. The image controller is configured to perform integration of the first image processing information, the second image processing information, and the third image processing information and thereby recognize a traveling environment of the vehicle.

8 Claims, 6 Drawing Sheets (51) Int. Cl.
*G06T 7/73* (2017.01)
*B60R 11/04* (2006.01)
(52) U.S. Cl.
CPC .......... *G06T 7/73* (2017.01); *B60R 2300/105* (2013.01); *B60R 2300/107* (2013.01); *G06T 2207/30252* (2013.01)

(56) References Cited

U.S. PATENT DOCUMENTS

| | | | | |
|---|---|---|---|---|
| 2015/0358610 | A1* | 12/2015 | Takahashi | G06T 7/593 348/47 |
| 2016/0205384 | A1* | 7/2016 | Sekiguchi | H04N 13/239 348/50 |
| 2020/0108774 | A1* | 4/2020 | Hashimoto | H04N 13/10 |

OTHER PUBLICATIONS

Japanese Notification of Decision of Refusal issued in corresponding Japanese Patent Application No. 2018-182786, dated Mar. 24, 2020, with English translation.
Japanese Notification of Reasons for Refusal issued in corresponding Japanese Patent Application No. 2018-182786, dated Dec. 17, 2019, with English translation.

* cited by examiner

VEHICLE TRAVELING ENVIRONMENT DETECTING APPARATUS AND VEHICLE TRAVELING CONTROLLING SYSTEM

CROSS-REFERENCE TO RELATED APPLICATIONS

The present application claims priority from Japanese Patent Application No. 2018-182786 filed on Sep. 27, 2018, the entire contents of which are hereby incorporated by reference.

BACKGROUND

The technology relates to a vehicle traveling environment detecting apparatus that recognizes a traveling environment of a vehicle, and to a vehicle traveling controlling system that performs a traveling control of the vehicle on the basis of the thus-recognized traveling environment.

Various assist controls that assist a driver and automatic driving techniques that do not necessitate a driver's driving operation have been put into practical use for a vehicle such as an automobile. The assist controls and the automatic driving techniques capture an image of a forward landscape outside a vehicle by a camera, and process the image to thereby recognize a traveling environment of the vehicle. Non-limiting examples of the assist control may include: a contact avoidance that avoids a contact of the vehicle with a forward obstacle; a following control that causes the vehicle to follow a preceding vehicle; a warning control that gives a warning on wobbling running or on a deviation from a lane; and a steering control.

Japanese Unexamined Patent Application Publication (JP-A) No. H07-192199 discloses an image recognition technique that uses a stereo camera. The image recognition technique disclosed in JP-A No. H07-192199 determines information on a distance to a target and thus recognizes the target three-dimensionally, allowing for an advanced driving assist including automatic driving of a vehicle.

SUMMARY

An aspect of the technology provides a vehicle traveling environment detecting apparatus that includes: a first stereo camera including a first camera and a second camera that are disposed in a width direction of a vehicle; a second stereo camera including the first camera of the first stereo camera and a third camera, in which the third camera is disposed in a height direction of the vehicle relative to the first camera; a third stereo camera including the second camera of the first stereo camera and a fourth camera, in which the fourth camera is disposed in the height direction relative to the second camera; a first image processor configured to perform stereo image processing on a first outside image and thereby determine first image processing information including first distance information, in which the first outside image is configured to be obtained through imaging of an environment outside the vehicle by the first stereo camera; a second image processor configured to perform the stereo image processing on a second outside image and thereby determine second image processing information including second distance information, in which the second outside image is configured to be obtained through imaging of the environment outside the vehicle by the second stereo camera; a third image processor configured to perform the stereo image processing on a third outside image and thereby determine third image processing information including third distance information, in which the third outside image is configured to be obtained through imaging of the environment outside the vehicle by the third stereo camera; and an image controller configured to perform integration of the first image processing information determined by the first image processor, the second image processing information determined by the second image processor, and the third image processing information determined by the third image processor and thereby recognize a traveling environment of the vehicle.

An aspect of the technology provides a vehicle traveling controlling system that includes a vehicle traveling environment detecting apparatus and a traveling controller. The vehicle traveling environment detecting apparatus includes a first stereo camera including a first camera and a second camera that are disposed in a width direction of a vehicle, a second stereo camera including the first camera of the first stereo camera and a third camera, in which the third camera is disposed in a height direction of the vehicle relative to the first camera, a third stereo camera including the second camera of the first stereo camera and a fourth camera, in which the fourth camera is disposed in the height direction relative to the second camera, a first image processor configured to perform stereo image processing on a first outside image and thereby determine first image processing information including first distance information, in which the first outside image is configured to be obtained through imaging of an environment outside the vehicle by the first stereo camera, a second image processor configured to perform the stereo image processing on a second outside image and thereby determine second image processing information including second distance information, in which the second outside image is configured to be obtained through imaging of the environment outside the vehicle by the second stereo camera, a third image processor configured to perform the stereo image processing on a third outside image and thereby determine third image processing information including third distance information, in which the third outside image is configured to be obtained through imaging of the environment outside the vehicle by the third stereo camera, and an image controller configured to perform integration of the first image processing information determined by the first image processor, the second image processing information determined by the second image processor, and the third image processing information determined by the third image processor and thereby recognize a traveling environment of the vehicle. The traveling controller configured to control traveling of the vehicle including acceleration, deceleration, and steering, on the basis of the traveling environment recognized by the image controller.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

A technique disclosed in JP-A No. H07-192199 provides two sets of stereo cameras on a vehicle, one of which is for a short distance and the other is for a long distance, to allow for a detection of a target over a wide range in a traveling direction of the vehicle. The technique disclosed in JP-A No. H07-192199, however, still leaves room for improvement in terms of blind spots of the stereo cameras with respect to a plurality of targets present on right and left sides of a region ahead of the own vehicle. For example, the technique of JP-A No. H07-192199 still leaves room for improvement in terms of a blind spot of the stereo cameras with respect to a motorcycle or a bicycle traveling beside a preceding vehicle present ahead of the own vehicle, or a pedestrian present on a roadside.

A stereo camera, structured by two cameras disposed on right and left sides of a vehicle, can suffer from an occurrence of a region, i.e., a so-called occlusion region, in which a target is in an image obtained by one of the cameras but the target is not in an image obtained by the other of the cameras due to, for example, hiding of the target behind an object. The occurrence of the occlusion region can make distance information partially unobtainable, and is less likely to be solved simply by widening a field of view of the cameras. The partial loss of the distance information can make a smooth traveling control difficult.

It is desirable to provide a vehicle traveling environment detecting apparatus and a vehicle traveling controlling system that are able to detect properly not only a target present ahead of a vehicle but also a target present on a right side, a left side, or both of a region ahead of the vehicle, and thereby to calculate distance information necessary for a traveling control.

Figure 1:
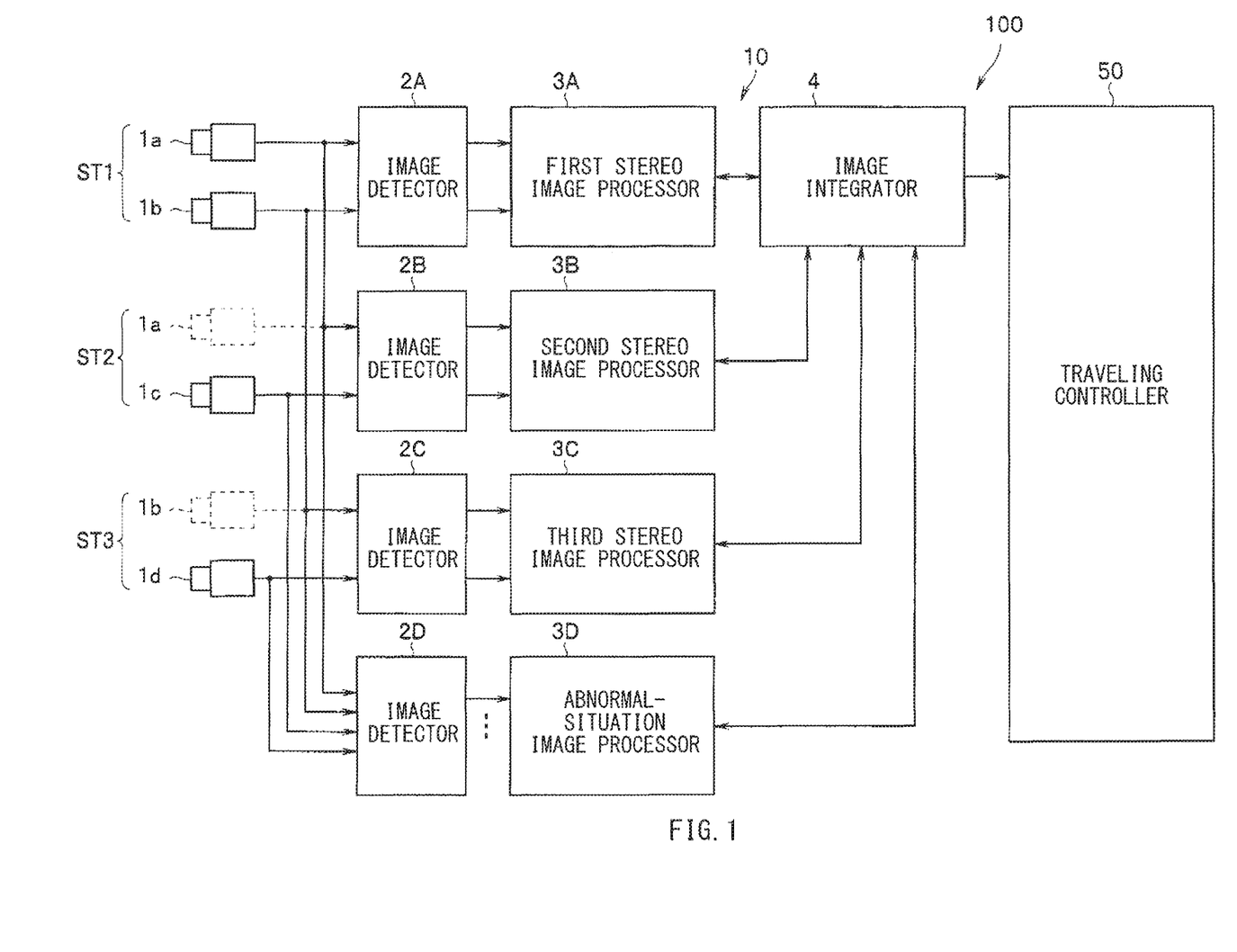
FIG. 1 is a configuration diagram illustrating an example of a vehicle traveling controlling system according to one example embodiment of the technology.
Figure 2:
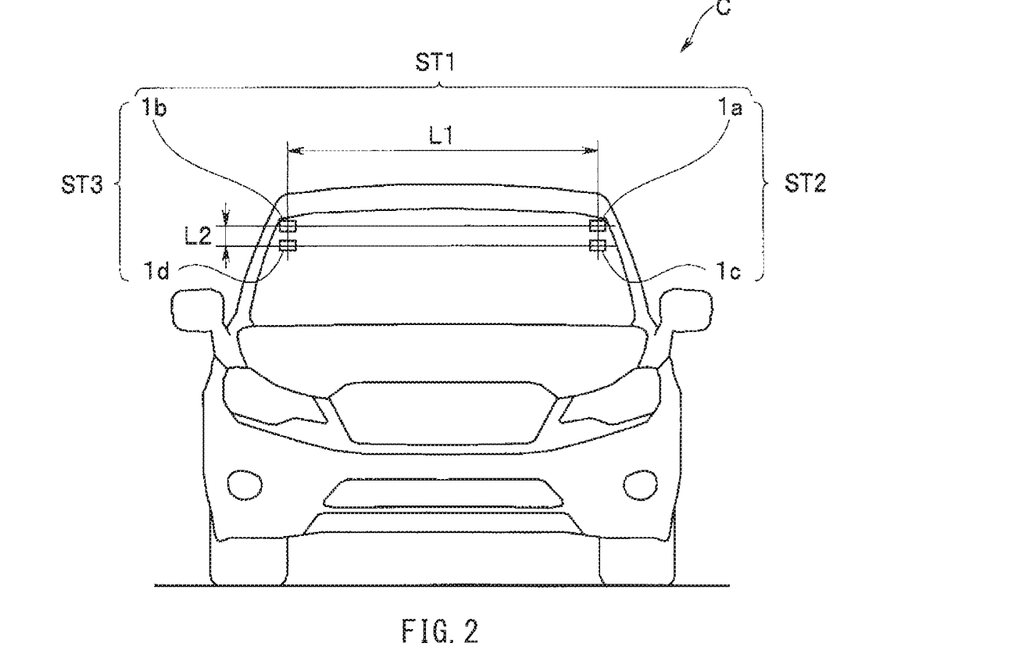
FIG. 2 is a diagram illustrating an example arrangement of a plurality of sets of stereo cameras mounted on a vehicle.

Referring to FIGS. 1 and 2, a vehicle traveling controlling system 100 of a vehicle C includes a traveling environment detector 10 and a traveling controller 50. The traveling environment detector 10 detects a traveling environment of the vehicle C. The traveling controller 50 performs a traveling control on the basis of information obtained by the traveling environment detector 10. Non-limiting examples of the traveling control may include a driving assist and an automatic driving. The traveling environment detector 10 may process an image of a landscape outside the vehicle C (i.e., an outside image) and calculate a distance to a target. Further, the traveling environment detector 10 may output, to the traveling controller 50, information on the target recognized on the basis of the calculated distance. The image of the landscape outside the vehicle C may be captured by a stereo camera that performs imaging of the same target from different perspectives. Non-limiting examples of the information on the target may include a size and a shape of the target.

In some example embodiments, the vehicle C includes a plurality of sets of stereo cameras. In the present example embodiment, the vehicle C may include three sets of stereo cameras ST1, ST2, and ST3 that are different from each other in region to be detected. The stereo cameras ST1, ST2, and ST3 each may include two cameras and may be able to obtain two camera images. The two cameras each may include an imaging device such as a charge-coupled device (CCD) or a complementary metal-oxide semiconductor (CMOS), and may have their respective shutters that are driven in synchronization with each other. The two cameras may be fixed with a predetermined baseline length provided therebetween and with their respective optical axes being parallel to each other. For example, the two cameras may be provided at a location that is an upper part of the vehicle interior and behind a windshield.

For example, referring to FIG. 2, the vehicle C may include four cameras including a first camera 1a, a second camera 1b, a third camera 1c, and a fourth camera 1d. Two of the first camera 1a, the second camera 1b, the third camera 1c, and the fourth camera 1d may be combined in any combination to configure corresponding one of the three sets of stereo cameras that are to be used in an ordinary situation. In other words, the first stereo camera ST1, the second stereo camera ST2, and the third stereo camera ST3 each may include any combination of two cameras among the first to the fourth cameras 1a to 1d. In the following description, the first camera 1a, the second camera 1b, the third camera 1c, and the fourth camera 1d are simply referred to as cameras 1a, 1b, 1c, and 1d, respectively. In addition, in the following description, the first stereo camera ST1, the second stereo camera ST2, and the third stereo camera ST3 are simply referred to as stereo cameras ST1, ST2, and ST3, respectively.

The stereo camera ST1 includes the two cameras 1a and 1b that are disposed in a width direction of the vehicle C. The stereo camera ST1 may serve as a main stereo camera, and may primarily detect a region ahead of the vehicle C as its detection region. The stereo cameras ST2 and ST3 include the cameras 1c and 1d that are disposed in a height direction of the vehicle C relative to the cameras 1a and 1b of the stereo camera ST1. The stereo cameras ST2 and ST3 may serve as subsidiary stereo cameras that compensate for a region undetected by the stereo camera ST1. As described later in greater detail, any combination of the four cameras other than the stereo cameras ST1, ST2, and ST3 may be used for an emergency purpose upon an occurrence of abnormality, including the use of a single camera alone to capture a single camera image.

In some example embodiments, the stereo camera ST1 may include the cameras 1a and 1b that are so disposed as to have a focal distance f and a baseline length L1, where the width direction or a lateral direction of the vehicle C is a horizontal direction. In the present example embodiment, the cameras 1a and 1b may be so adjusted mechanically and electrically as to allow their respective imaging planes to be brought into coincidence with each other with their mutual optical axes being parallel to each other, and as to allow horizontal axis directions (directions of horizontal scanning lines) of their mutual imaging planes to be brought into coincidence with each other, i.e., to be not rotated with respect to each other.

The stereo camera ST2 may include the camera 1a that serves as one of the stereo camera ST1 and the camera 1c disposed below the camera 1a in a perpendicular direction, where the height direction or a vertical direction of the vehicle C is the perpendicular direction. In the present example embodiment, the camera 1c may be so disposed as to have the same focal distance f as the camera 1a. Further, the cameras 1a and 1c may be so adjusted mechanically and electrically as to allow their respective imaging planes to be brought into coincidence with each other with their mutual optical axes being parallel to each other, and as to allow vertical axis directions (directions of vertical scanning lines) of their mutual imaging planes to be brought into coincidence with each other, i.e., to be not rotated with respect to each other.

The stereo camera ST3 may likewise include the camera 1b that serves as the other one of the stereo camera ST1 and the camera 1d disposed below the camera 1b in the perpendicular direction, where the height direction of the vehicle C is the perpendicular direction. In the present example embodiment, the camera 1d may be so disposed as to have the same focal distance f as the camera 1b, and the cameras 1b and 1d may be disposed in a similar relationship to the cameras 1a and 1c. Accordingly, the cameras 1a and 1c and the cameras 1b and 1d may be so disposed as to have the same baseline length L2. An interval between the optical axes of the respective cameras 1c and 1d may be the same in interval as the baseline length L1 between the cameras 1a and 1b.

For example, the four cameras 1a, 1b, 1c, and 1d may be provided at locations that are the upper part of the vehicle interior, behind the windshield, and near pillars so as not to hinder a field of view of the driver. The cameras 1a, 1b, 1c, and 1d may be mutually fixed through a stay or any other member, or may be fixed through the stay or any other member to the pillars or to any vehicle member. The pillars may be positioned at ends of the windshield. The vehicle member may be positioned at a front-end part of a roof of the vehicle C.

The traveling environment detector 10 includes circuitries corresponding to the respective cameras 1a, 1b, 1c, and 1d. In some example embodiments, the traveling environment detector 10 may include image detectors 2A, 2B, 2C, and 2D, a first stereo image processor 3A, a second stereo image processor 3B, a third stereo image processor 3C, an abnormal-situation image processor 3D, and an image integrator 4. The traveling controller 50 may perform an optimal traveling control in accordance with the traveling environment that is based on information acquired from the image integrator 4.

The image detectors 2A, 2B, 2C, and 2D each may perform preprocessing and various corrections on the corresponding camera to thereby obtain original images directed to stereo image processing. For example, the original images each may be expressed by an i-j coordinate system where a bottom left corner of the image is the origin, the horizontal direction corresponds to an i-coordinate axis, and the vertical direction corresponds to a j-coordinate axis.

One of the original images may serve as a reference image and the other of the original images may serve as a comparison image upon the stereo image processing, and may be stored at a predetermined address of an input image memory as a pair of camera images or as digital images.

The image detectors 2A, 2B, 2C, and 2D each may be basically similar to each other in process to be performed, with exception that images of the respective cameras to be processed are different. For example, the image detector 2A may process the images obtained by the stereo camera ST1 (i.e., the cameras 1a and 1b) and the image detector 2B may process the images obtained by the stereo camera ST2 (i.e., the cameras 1a and 1c). The image detector 2C may process the images obtained by the stereo camera ST3 (i.e., the cameras 1b and 1d). The image detector 2D may process images of the cameras that are usable normally as the stereo camera upon the occurrence of abnormality.

Non-limiting examples of the preprocessing to be performed on the corresponding camera may include: an electronic shutter control of any corresponding camera; a control and an adjustment of a gain and an offset of an amplifier; a luminance correction such as a gamma ($\gamma$) correction based on a look-up table (LUT); and a shading correction. Non-limiting examples of the correction to be performed on the images of the corresponding camera may include: setting of image processing coordinates; an image size adjustment; setting of various parameters upon a memory address control, etc.; an affine correction that corrects an optical misalignment, such as a lens distortion, corresponding to the pair of captured images; and a filter correction such as a noise removal process.

Figure 3:
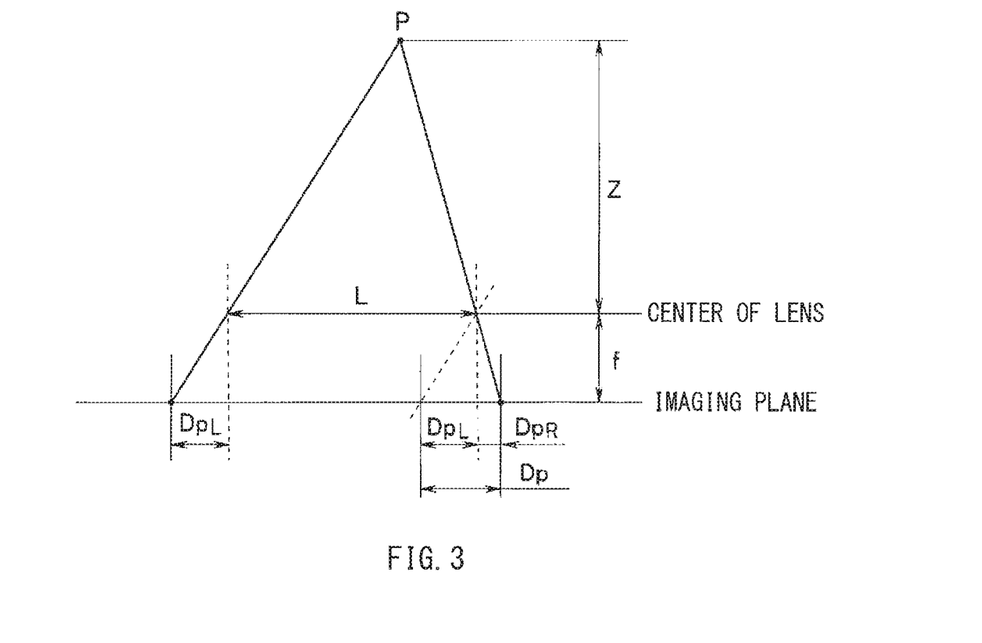
FIG. 3 is a diagram illustrating an example of distance measurement performed by any of the stereo cameras.

The first stereo image processor 3A may perform a stereo-matching process on the pair of images obtained by the stereo camera ST1, i.e., the cameras 1a and 1b, to thereby calculate a distance to a target. Referring to FIG. 3, a distance measurement based on a known stereo method involves a calculation of a distance Z. The distance Z may be a distance from the center of a lens to a target P, and may be determined from the Expression (2) that is derived from a relationship as defined by the Expression (1):

$$Z:L=f:dp \qquad (1)$$

$$Z=L \times f/dp \qquad (2)$$

where: d is an amount of shift (i.e., parallax) of a corresponding point between the reference image and the comparison image that are captured by the stereo camera ST1 (i.e., d=a pixel shift amount dpL of the comparison image+a pixel shift amount dpR of the reference image); L is an interval between optical axes (i.e., a baseline length) of the reference camera that captures the reference image and the comparison camera that captures the comparison image; and f is a focal distance of the lens, as illustrated in FIG. 3. The Expression (1) is based on the principle of triangulation.

The first stereo image processor 3A may determine the pixel shift amount (i.e., the parallax) at the corresponding position between the reference image and the comparison image by means of the stereo-matching process, and may thereby generate a distance image having distance data. In some example embodiments, the example stereo-matching process may involve: evaluating a degree of correlation between the reference image and the comparison image by means of a known region-searching method; and calculating, as an evaluation mathematical function, a sum of absolute difference (SAD) related to a difference (an absolute value) between a small region (a main block) of the reference image and a small region (a subsidiary block) of the comparison image.

A value of the evaluation mathematical function obtained by the SAD may be determined by calculating a value of the SAD between the main block M(i, j) of the reference image and the subsidiary block S(i, j) of the comparison image while shifting coordinates (e.g., an i-coordinate) on an i-axis (an epipolar line) by a predetermined shift amount, as expressed by the following Expression (3):

$$SAD=\Sigma|M(i,j)-S(i,j)| \qquad (3)$$

where: a position on an image plane is defined as a rectangular coordinate system in which a horizontal axis corresponds to an i-coordinate and a vertical direction corresponds to a j-coordinate; and any block in which the degree of correlation is to be searched is defined as a search block defined by i×j (where i=0 to n and j=0 to n).

Further, a position at which the value of the evaluation mathematical function obtained by the SAD becomes the minimum may be determined as a corresponding position (i.e., a point of coincidence) at which the degree of correlation between the main block and the subsidiary block is the highest. A shift amount, on a pixel basis, between the main block and the subsidiary block (i.e., a difference between a position of the main block and a position of the subsidiary block in a horizontal scanning direction) at the point of coincidence may be given a parallax having a resolution on a pixel basis (i.e., a pixel parallax). An aggregation of the parallaxes calculated on a block basis may be stored as the distance data that configures the distance image.

In general, a luminance value of each pixel may often be used for a pixel value. In addition, the distance information based on the pixel parallax can involve a decrease in resolution as a distance to the target increases. Optionally, to address the decrease in resolution, a process may be performed that determines a parallax at a sub-pixel level corresponding to a resolution that is equal to or less than one-pixel unit.

It is to be noted that, under a traveling environment that changes in a variety of fashions, a so-called occlusion region can sometimes occur in a case where a region ahead of the own vehicle is imaged by means of the stereo camera ST1 that may be used as a main camera in some example embodiments. The occlusion region is a region in which a target is in an image obtained by one of the cameras 1a and 1b but the target is not in an image obtained by the other of the cameras 1a and 1b due to, for example, hiding of the target behind an object. The occurrence of the occlusion region can lead to a situation in which a point corresponding to a certain location in one of the images does not exist in the other image, which in turn leads to a generation of mismatching, making it difficult or not possible to detect the parallax.

Figure 4:
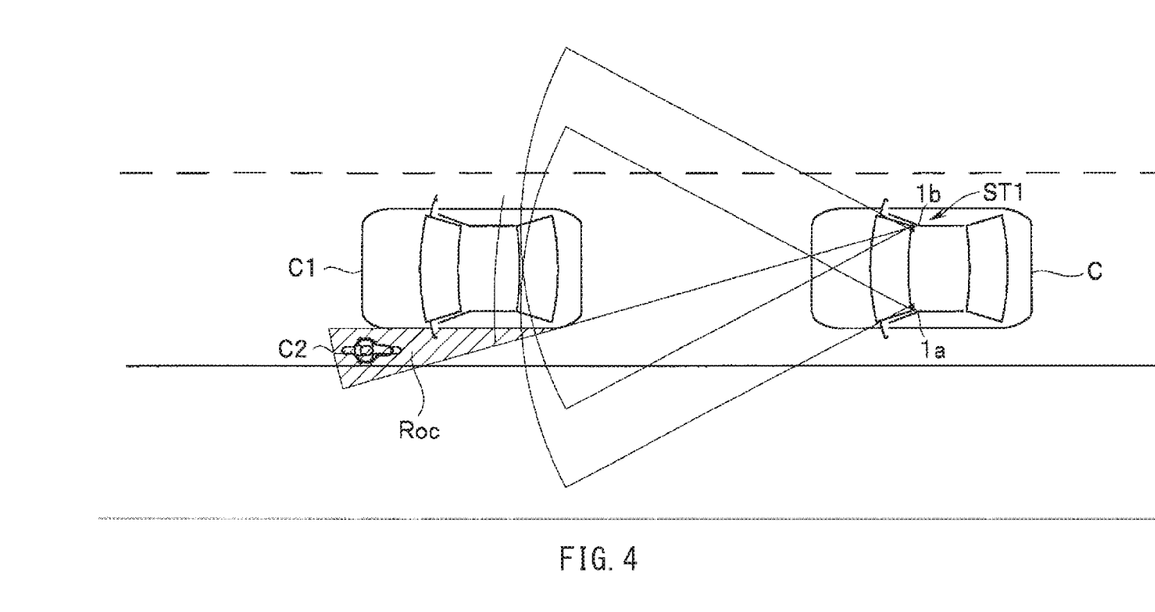
FIG. 4 is a diagram illustrating an example of an occlusion region resulting from the stereo cameras.

For example, referring to FIG. 4, if a preceding vehicle C1, traveling ahead of the own vehicle C, is positioned relatively close to the own vehicle C in a case where the preceding vehicle C1 is imaged by the stereo camera ST1, a region Roc is generated in which a region beside a field of view of the imaging, performed by the camera 1b as one of the cameras 1a and 1b, is blocked by a rear part of the preceding vehicle C1 and is thus hidden by the rear part of the preceding vehicle C1. The generation of the region Roc makes it difficult or not possible to detect a motorcycle C2 that travels beside the preceding vehicle C1. Under such circumstances, the camera 1a as the other of the cameras 1a and 1b of the stereo camera ST1 successfully captures the motorcycle C2 and is able to identify the motorcycle C2; however, the stereo camera ST1 fails to calculate a distance to the motorcycle C2 consequently.

The second stereo image processor 3B and the third stereo image processor 3C, however, may respectively calculate a parallax in the vertical direction generated in a pair of images obtained by the stereo camera ST2 (i.e., the cameras 1a and 1c) and a parallax in the vertical direction generated in a pair of images obtained by the stereo camera ST3 (i.e., the cameras 1b and 1d). By calculating the parallaxes, the second stereo image processor 3B and the third stereo image processor 3C thereby allows for calculation of the distance to the target present in a region present beside the preceding vehicle C1, e.g., present on a right side, a left side, or both, that can possibly serve as the occlusion region for the stereo camera ST1. A stereo image processing to be performed by each of the second stereo image processor 3B and the third stereo image processor 3C may be basically similar to the stereo image processing performed by the first stereo image processor 3A, with exception that images to be processed and a direction in which the parallax is to be searched are different from those of the first stereo image processor 3A.

The second stereo image processor 3B and the third stereo image processor 3C each may respectively search the corresponding points by means of the stereo cameras ST2 and ST3 that are used for the vertical direction. Thus, it is possible to reduce the mismatching in the corresponding points even in a situation where: a change in feature quantity in the images (i.e., an image feature quantity) in a lateral direction is smaller than a predetermined threshold; and the mismatching in the corresponding points is likely to occur accordingly. Note that the situation holds true even within the field of view of the stereo camera ST1. Non-limiting examples of a factor that causes the change in feature quantity, in terms of a shape or a color (e.g., luminance), in the lateral direction to be small may include: a guardrail; a concrete wall of a building or a fence; and a road surface of a paved road. In one embodiment, the first stereo image processor 3A may serve as a "first image processor". In one embodiment, the second stereo image processor 3B may serve as a "second image processor". In one embodiment, the third stereo image processor 3C may serve as a "third image processor".

The abnormal-situation image processor 3D may calculate the distance to the target by means of a stereo image obtained by a combination of normal cameras or by means of a single camera image obtained by a single camera, in a case where abnormality occurs upon acquiring the images. In some example embodiments, the abnormal-situation image processor 3D may calculate the distance to the target when it is difficult or not possible to perform the stereo matching normally by any of the stereo cameras ST1, ST2, and ST3. For example, in a case where the abnormality occurs upon acquiring the images by the stereo camera ST1 that is used for the width direction of the vehicle C and that may serve as the main camera, the abnormal-situation image processor 3D may combine the cameras 1c and 1d disposed below the stereo camera ST1 and use such a combination of the cameras 1c and 1d in place of the stereo camera ST1. By combining the cameras 1c and 1d as an emergency stereo camera, the abnormal-situation image processor 3D may perform the stereo image processing. In one embodiment, the abnormal-situation image processor 3D may serve as a "fourth image processor".

In some example embodiments, in a case where the camera 1a of the stereo camera ST1 is abnormal and the camera 1b is normal, the abnormal-situation image processor 3D may perform the stereo image processing through: the stereo camera that includes the cameras 1c and 1d used for the width direction of the vehicle C; and the stereo camera ST3 that is used for the height direction of the vehicle C and that may serve as the subsidiary stereo camera. In this example case, the camera 1c may serve as a single camera and may thus compensate for an operation of the subsidiary stereo camera ST2 that becomes disabled by the abnormality of the camera 1a.

In some example embodiments, in a case where the camera 1b of the stereo camera ST1 is abnormal and the camera 1a is normal, the abnormal-situation image processor 3D may perform the stereo image processing through: the stereo camera that includes the cameras 1c and 1d; and the stereo camera ST2 that may serve as the subsidiary stereo camera. In this example case, the camera 1d may serve as a single camera and may thus compensate for an operation of the subsidiary stereo camera ST3 that becomes disabled by the abnormality of the camera 1b.

The distance to the target may be calculated by the single camera 1c or the single camera 1d by means of a known technique related to single-camera image processing. For example, a technique such as an edge extraction, a pattern matching, or an optical flow of images may be used to extract a region of a target on a single camera image, and a distance conversion table may be used to convert a position of the region on the image into a position on a real space. The distance conversion table may represent a correspondence relationship between positions of respective pixels on an image and distances of the respective pixels, on the basis of a factor such as a location of a camera or an angle.

In some example embodiments where both of the stereo cameras ST2 and ST3 used for the height direction of the vehicle C involve the abnormality and the abnormal cameras are positioned in an upside-down fashion with respect to each other (i.e., the normal cameras and the abnormal cameras between the stereo cameras ST2 and ST3 are so positioned that one of the normal cameras and one of the abnormal cameras are respectively positioned above and below and the other of the normal cameras and the other of the abnormal cameras are respectively positioned below and above), a stereo camera including two cameras that are positioned diagonally with respect to the width direction of the vehicle C (i.e., a combination of the cameras 1a and 1d or a combination of the cameras 1b and 1c), or a multiple-camera stereo camera including three cameras, may be set to allow for the calculation of the parallax even upon the occurrence of such abnormality. In such a case, however, a calculation load upon the stereo image processing can increase and a region in which the target is detectable can become narrow. Accordingly, in some example embodiments, these combinations of cameras may be used limitedly as a stereo camera.

The image integrator 4 integrates pieces of information on the image processing (i.e., pieces of image processing information) determined by the first stereo image processor 3A, the second stereo image processor 3B, and the third stereo image processor 3C, and thereby generates an integrated image. By generating the integrated image, the image integrator 4 recognizes a traveling environment. Further, upon abnormality, the image integrator 4 may combine information on the image processing (i.e., image processing information) determined by the abnormal-situation image processor 3D with any information on the normal image processing, and may output the combined information to the traveling controller 50. In one embodiment, the image integrator 4 may serve as an "image controller".

In some example embodiments, the image integrator 4 may integrate the distance images obtained by the respective first stereo image processor 3A, second stereo image processor 3B, and third stereo image processor 3C, as the integration of the pieces of information on the image processing. The image integrator 4 may perform coordinate transformation of a point on the integrated distance image such that the point is transformed into a point on a real space, where: the width direction of the own vehicle, i.e., a right-left direction, corresponds to an X axis; the height direction of the own vehicle corresponds to a Y axis; and a longitudinal direction, i.e., a distance direction, corresponds to a Z axis. By performing the coordinate transformation, the image integrator 4 may recognize a target three-dimensionally, and may detect a size of the target on the basis of the distance information. Non-limiting examples of the target may include a preceding vehicle that travels ahead of the own vehicle and an obstacle. The image integrator 4 may detect the size of the target by detecting a horizontal distance between portions of the same target that are equally distant. For example, the image integrator 4 may detect a distance between the brake lights of the preceding vehicle or a distance between right and left ends of the preceding vehicle as the size of the preceding vehicle. Further, the image integrator 4 may detect a thickness or a width of a lane line (e.g., a white line) as a size of the lane line.

In some example embodiments, the integration of the distance images may involve a process of combining the distance image, obtained by the first stereo image processor 3A as a main distance image, with the distance images obtained by the respective second stereo image processor 3B and third stereo image processor 3C to thereby expand a detection region. Upon expanding the detection region, the image integrator 4 may give instructions, to each of the first stereo image processor 3A, the second stereo image processor 3B, and the third stereo image processor 3C, related to a region in which the parallax is to be searched by each of those image processors, such that the detection region is expanded while reducing a calculation load.

Figure 5:
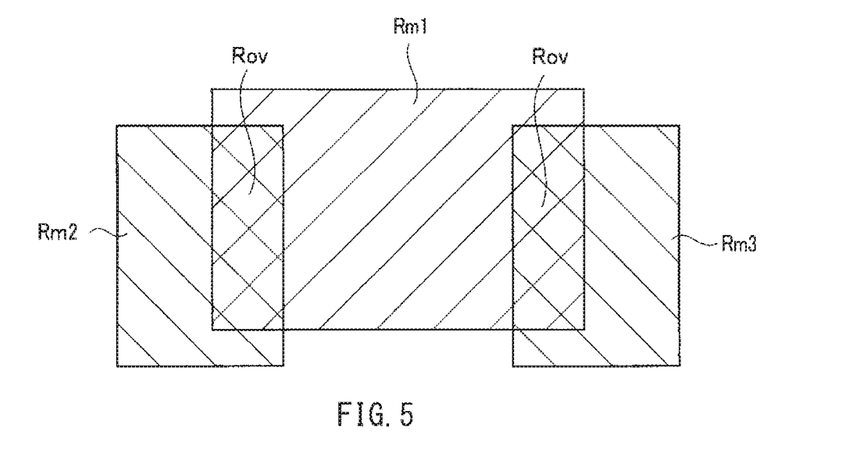
FIG. 5 is a diagram illustrating example detection regions of the respective stereo cameras.

For example, referring to FIG. 5, the image integrator 4 may reduce the sizes of the detection regions of the respective subsidiary stereo cameras ST2 and ST3 from their original sizes of the detection regions, as compared with a size of a detection region Rm1 for the target assigned to the main stereo camera ST1. By reducing the sizes of the detection regions of the respective subsidiary stereo cameras ST2 and ST3, the image integrator 4 may set detection regions Rm2 and Rm3 that are positioned outwardly in the width direction of the vehicle C that is orthogonal to a direction in which the parallax is to be detected, and may instruct the regions in which the parallax is to be searched. The detection regions Rm2 and Rm3 may be set in consideration of a traveling environment, such as: the occlusion region that may possibly be generated on the right side, the left side, or both of the detection region Rm1 within the detection region Rm1; or a road situation. The detection regions Rm2 and Rm3 may be so disposed as to be overlapped, by a predetermined region Rov, with the detection region Rm1 on both sides of the detection region Rm1.

Figure 6:
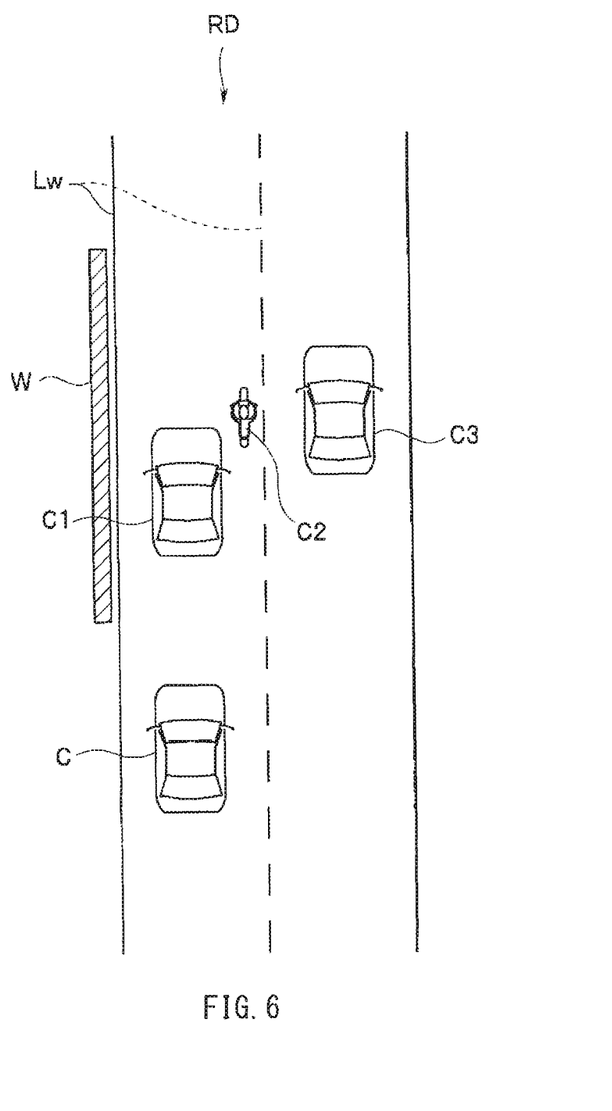
FIG. 6 is a diagram illustrating example detection targets to be detected by the respective stereo cameras upon traveling that follows a preceding vehicle.

With this configuration, referring to an example of FIG. 6, factors including the preceding vehicle C1 present ahead of the own vehicle C and lane lines Lw of a road RD having two lanes on each side are detected while the own vehicle C travels on the two-lane road, by processing the images obtained by the normal stereo camera ST1 disposed in the lateral direction. Further, targets difficult to be detected on the basis of the images obtained by the normal stereo cameras ST1 may be detected by processing the images obtained by the stereo cameras ST2 and ST3 disposed in the vertical direction. In FIG. 6, the targets difficult to be detected on the basis of the images obtained by the normal stereo cameras ST1 may include: a sidewall W, which is disposed on a roadside and small in changes in luminance; a motorcycle C2 traveling beside the preceding vehicle C1; and a preceding vehicle C3 traveling on an adjacent lane. Accordingly, it is possible to expand areas used for the detection of the targets to the adjacent lane and to the roadside, including the traveling lane of the own vehicle C.

It is to be noted that the lane lines Lw ahead of the own vehicle C can be blocked by the preceding vehicle C1 when an intervehicle distance between the own vehicle C and the preceding vehicle C1 becomes small upon traffic congestion, for example. In such a case, in an existing technique, traveling is so performed as to follow the preceding vehicle C1 if the normal stereo camera ST1 is only provided. The following traveling that follows the preceding vehicle C1 tends to run along a trajectory having travelled by the preceding vehicle C1, which tends to cause a behavior of the own vehicle C to be dependent on a behavior of the preceding vehicle C1.

In contrast, according to the present example embodiment, the stereo cameras ST2 and ST3 allow for the detection of the targets including the right and the left lane lines Lw which are undetectable by the stereo camera ST1. The stereo cameras ST2 and ST3 may be disposed in the vertical direction and provided on both sides of the stereo camera ST1 that is disposed in the lateral direction. Thus, the present example embodiment allows for the traveling that follows along the lane, which in turn allows for the stable traveling unaffected by the behavior of the preceding vehicle C1, even upon, for example, the traffic congestion where the own vehicle C travels at a low speed and approaches the preceding vehicle C1.

In some example embodiments, the pieces of information on the image processing determined by the second stereo image processor 3B corresponding to the stereo camera ST2 and the third stereo image processor 3C corresponding to the stereo camera ST3 may be combined only when a loss resulting from the occlusion occurs in the distance image obtained by the first stereo image processor 3A corresponding to the stereo camera ST1. For example, the image integrator 4 may detect the loss in the distance information resulting from the occlusion, by comparing the parallaxes calculated for each search block and determining whether the compared parallaxes belong to the same block by means of the matching. The image integrator 4 may thereafter use the information on the image processing determined by the second stereo image processor 3B or the third stereo image processor 3C that corresponds to any part having the loss of the distance information to complement the distance information having the loss.

The traveling controller 50 performs the traveling control on the basis of the information obtained from the thus-configured traveling environment detector 10. For example, the traveling controller 50 may sense sizes and distances of respective targets present in a wide range, on the basis of the information on the image processing determined by the stereo camera ST1 disposed in the width direction of the vehicle C and the pieces of information on the image processing determined by the stereo cameras ST2 and ST3 that are disposed in the vertical direction. Thus, a part of the stereo camera ST1 is shared by one or both of the stereo cameras ST2 and ST3. For example, the traveling controller 50 may sense the sizes, the distances, or both of the respective targets that may present not only in the front of the own vehicle C, including the traveling lane of the own vehicle C, but also at any adjacent lane, the roadside, or both. By sensing the sizes and/or the distances of the respective targets, the traveling controller 50 performs the traveling control including acceleration, deceleration, and steering.

For example, the traveling controller 50 may calculate a trajectory of a target point that is to be followed by the own vehicle, on the basis of the information on recognition of the traveling environment recognized by the traveling environment detector 10, and may so control the own vehicle C as to travel at a set speed along the trajectory of the target point as a target course. In an example embodiment where a lane keep control is to be performed that keeps a traveling position of the own vehicle C at the middle of the lane, the target point to be followed by the own vehicle C may be set to a middle position in a width direction of a road defined by the right and left lane lines of the lane. In an alternative example embodiment where an adaptive cruise control is to be performed that causes the own vehicle C to travel and follow the preceding vehicle present ahead of the own vehicle C, the target point to be followed by the own vehicle C may be set to a middle position in a width direction of the preceding vehicle.

The traveling controller 50 may thus calculate the trajectory of the target point and set the target course, and perform an acceleration-deceleration control and a steering control. The acceleration-deceleration control uses an engine, a transmission, and a brake which are unillustrated such that the own vehicle C travels at the set speed along the target course. The steering control uses an unillustrated steering device to control a current steering angle such that a central position in the width direction of the own vehicle C comes into coincidence with the target point on the target course.

The traveling controller 50 may perform the traveling control on the basis of the pieces of information on the image recognition obtained by one or more of the stereo cameras ST1, ST2, and ST3, in addition to information such as positioning information or map information. The positioning information may be related to a position of the own vehicle C based on signals received from a plurality of navigation satellites such as a global navigation satellite system (GNSS). The map information may include a multidimensional map or a dynamic map that holds, in a plurality of layers, static pieces of information and dynamic pieces of information. For example, the static information may be related to a shape of a road and a connection relationship between roads. For example, the dynamic information may be related to traffic information collected by an infrastructure communication.

Figure 7:
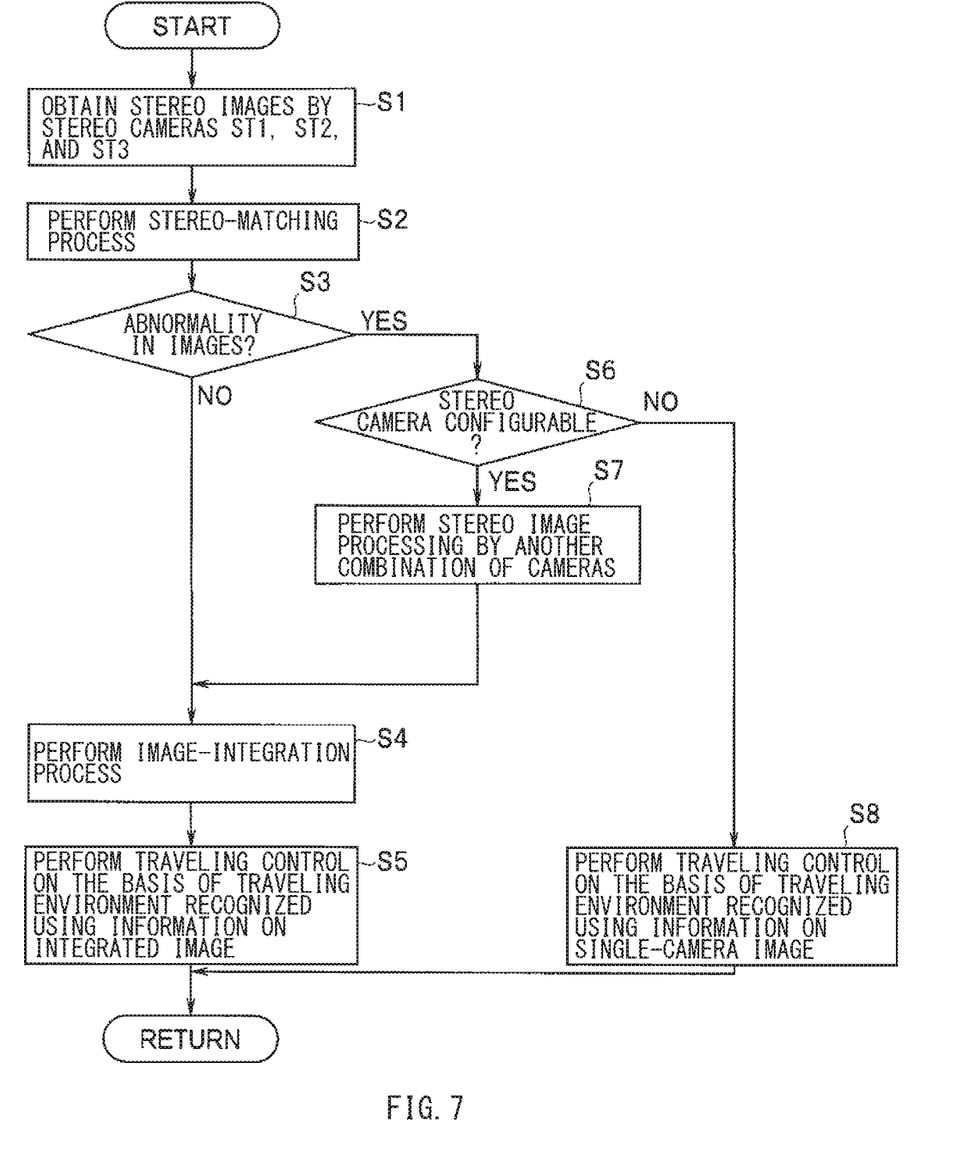
FIG. 7 is a flowchart illustrating an example of an operation of the vehicle traveling controlling system.

A description is given next, with reference to a flowchart illustrated in FIG. 7, of an example of an operation of the vehicle traveling controlling system 100 that uses one or more of the stereo cameras ST1 to ST3. FIG. 7 is a flowchart illustrating an example of operations in which any of the four cameras structuring the stereo cameras ST1 to ST3 is used. In some example embodiments, the traveling control may be stopped to make a transition to a manual driving mode in which the vehicle C is driven by an operation performed by the driver, when the abnormality occurs in all of the four cameras.

First, at step S1, the vehicle traveling controlling system 100 may cause the traveling environment detector 10 to obtain the stereo images captured by the respective stereo cameras ST1, ST2, and ST3. Thereafter, at step S2, the traveling environment detector 10 may perform the stereo-matching process on each of the stereo images obtained by the stereo cameras ST1, ST2, and ST3. By performing the stereo-matching process, the traveling environment detector 10 may search the corresponding point in each of the stereo images and generate the distance images having the distance information on the target.

Thereafter, at step S3, the traveling environment detector 10 may check whether an abnormality occurs in the images. For example, the traveling environment detector 10 may check whether it is difficult or not possible to perform the stereo matching normally on each of the stereo images obtained by the stereo cameras ST1, ST2, and ST3. The flow may proceed to step S4 from step S3 if no abnormality occurs in the images, i.e., if the traveling environment detector 10 determines that all of the stereo images obtained by the stereo cameras ST1, ST2, and ST3 are normal (step S3: NO). The flow may proceed to step S6 from step S3 if the abnormality occurs in the images, i.e., if the traveling environment detector 10 determines that any of the stereo images obtained by the stereo cameras ST1, ST2, and ST3 involves the abnormality (step S3: YES).

If all of the stereo images obtained by the stereo cameras ST1, ST2, and ST3 are determined by the traveling environment detector 10 as being normal at step S3 (step S3: NO), at step S4, the traveling environment detector 10 may integrate the distance images that are generated on the basis of the stereo images obtained by the stereo cameras ST1, ST2, and ST3. Further, the traveling environment detector 10 may transmit, to the traveling controller 50, the information on the traveling environment obtained as a result of the recognition performed on the integrated image. Thereafter, at step S5, the traveling controller 50 performs the traveling control on the basis of the traveling environment recognized using the information on the integrated image.

In contrast, if the abnormality occurs in the images at step S3 (step S3: YES), at step S6, the traveling environment detector 10 may check whether it is possible to configure a stereo camera with use of the normal cameras. If the traveling environment detector 10 determines that the stereo camera is configurable by the normal cameras at step S6 (step S6: YES), the flow may proceed to step S7 from step S6. At step S7, the traveling environment detector 10 may configure the stereo camera in any combination that excludes the abnormal camera, and perform the stereo image processing. For example, when the abnormality occurs in the images obtained by the stereo camera ST1 and if it is possible to combine the cameras 1c and 1d disposed below the stereo camera ST1 to configure the stereo camera in place of the stereo camera ST1, the flow may proceed to step S7 to perform the stereo image processing based on the combined stereo camera.

If the traveling environment detector 10 determines that the stereo camera is not configurable by the normal cameras at step S6 (step S6: NO), the flow may proceed to step S8 from step S6. For example, the traveling environment detector 10 may determines that the stereo camera is not configurable when only one normal camera is available, or when it is difficult or not possible to use the normal cameras as a regular stereo camera that detects a parallax in a horizontal direction or a vertical direction. At step S8, the traveling environment detector 10 may perform the image processing on the basis of images obtained by the single camera, and may transmit, to the traveling controller 50, the information on the traveling environment obtained as a result of the recognition performed on the single-camera image. Thereafter, at step S8, the traveling controller 50 performs the traveling control on the basis of the traveling environment recognized using the information on the single-camera image. For example, the distance may be calculated in the image processing based on the single-camera image, by means of a technique such as an edge extraction, a pattern matching, or an optical flow of images.

According to some example embodiments described above, the traveling environment may be recognized by integrating: the distance information that is based on the parallax in the horizontal direction obtained by the stereo camera ST1 disposed in the width direction of the vehicle C; and the pieces of distance information that are based on the parallaxes in the vertical direction obtained by the respective right and left stereo cameras ST2 and ST3 disposed in the height direction of the vehicle C. Thus, even if the loss occurs in the distance information obtained by the stereo camera ST1 disposed in the lateral direction resulting from a factor such as a blind spot of the cameras, it is possible to complement the distance information by one or both of the stereo cameras ST2 and ST3 disposed in the vertical direction, and to expand the recognition region in the lateral direction. Hence, it is possible to detect properly not only the target present ahead of the vehicle but also one or a plurality of targets present on the right side, the left side, or both of a region ahead of the vehicle, and thereby to calculate the distance information necessary for the traveling control. Accordingly, it is possible to perform an optimal traveling control.

Although some example embodiments of the technology have been described in the foregoing with reference to the accompanying drawings, the technology is by no means limited to the example embodiments described above. Various changes and modifications may be made to any embodiment without departing from the scope of the technology. The technology is intended to encompass such modifications and alterations in so far as they fall within the scope of the appended claims or the equivalents thereof.

The image integrator 4 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the image integrator 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the image integrator 4 illustrated in FIG. 1.

The invention claimed is:

1. A vehicle traveling environment detecting apparatus comprising:
a first stereo camera including a first camera and a second camera that are disposed in a width direction of a vehicle, the first stereo camera being configured to detect, as a first detection region, an environment outside the vehicle to generate a first outside image;
a second stereo camera including the first camera of the first stereo camera and a third camera, the third camera being disposed in a height direction of the vehicle relative to the first camera, the second stereo camera being configured to detect, as a second detection region, the environment outside the vehicle to generate a second outside image;

a third stereo camera including the second camera of the first stereo camera and a fourth camera, the fourth camera being disposed in the height direction relative to the second camera, the third stereo camera being configured to detect, as a third detection region, the environment outside the vehicle to generate a third outside image;

a first image processor configured to perform stereo image processing on the first outside image to determine first image processing information including first distance information;

a second image processor configured to perform the stereo image processing on the second outside image to determine second image processing information including second distance information;

a third image processor configured to perform the stereo image processing on the third outside image to determine third image processing information including third distance information; and an image controller configured to:
arrange i) a part of the second detection region associated with the second outside image to overlap a first area of the first detection region associated with the first outside image and ii) a part of the third detection region associated with the third outside image to overlap a second area of the first detection region associated with the first outside image, the first area located along a first side of the first detection region, the second area being located along a second side of the first detection region, the second side being opposite the first side of the first detection region in the width direction of the vehicle;

perform integration of the first image processing information of the first outside image, the second image processing information of the second outside image, and the third image processing information of the third outside image to recognize a traveling environment of the vehicle; and when the image controller detects, in the first area or the second area of the first detection region associated with the first outside image, a loss of the first distance information included in the first image processing information of the first outside image during the integration, compensate the loss of the first image processing information using at least one of the second image processing information of the second outside image and the third image processing information of the third outside image.

2. The vehicle traveling environment detecting apparatus according to claim 1, wherein
the second image processor is configured to determine the second distance information for a target that is different from a target for which the first distance information is determined by the first image processor, and
the third image processor is configured to determine the third distance information for a target that is different from: the target for which the first distance information is determined by the first image processor; and the target for which the second distance information is determined by the second image processor.

3. The vehicle traveling environment detecting apparatus according to claim 1, wherein the second image processor and the third image processor are configured to respectively determine the second distance information and the third distance information for respective targets in each of which a change, in image feature quantity, in the width direction is smaller than a predetermined threshold.

4. The vehicle traveling environment detecting apparatus according to claim 2, wherein the second image processor and the third image processor are configured to respectively determine the second distance information and the third distance information for respective targets in each of which a change, in image feature quantity, in the width direction is smaller than a predetermined threshold.

5. The vehicle traveling environment detecting apparatus according to claim 1, further comprising a fourth image processor configured to perform predetermined image processing and output, to the image controller, an image having been subjected to the predetermined image processing,
wherein, when at least one of the first camera, the second camera, the third camera, or the fourth camera has abnormality, the fourth image processor is configured to perform the predetermined image processing on a stereo image or a single camera image, the stereo image being configured to be obtained by a fourth stereo camera, the single camera image being configured to be obtained by normal one of the first to the fourth cameras that is free from the abnormality, the fourth stereo camera including a plurality of normal cameras that is free from the abnormality out of the first to the fourth cameras.

6. The vehicle traveling environment detecting apparatus according to claim 2, further comprising a fourth image processor configured to perform predetermined image processing and output, to the image controller, an image having been subjected to the predetermined image processing,
wherein, when at least one of the first camera, the second camera, the third camera, or the fourth camera has abnormality, the fourth image processor is configured to perform the predetermined image processing on a stereo image or a single camera image, the stereo image being configured to be obtained by a fourth stereo camera, the single camera image being configured to be obtained by normal one of the first to the fourth cameras that is free from the abnormality, the fourth stereo camera including a plurality of normal cameras that is free from the abnormality out of the first to the fourth cameras.

7. A vehicle traveling controlling system comprising:
a vehicle traveling environment detecting apparatus that includes
a first stereo camera including a first pair of cameras that are disposed in a width direction of a vehicle with relative to each other, the first stereo camera being configured to detect, as a first detection region, an environment outside the vehicle to generate a first outside image,
a second stereo camera including a second pair of cameras that are disposed in a height direction of the vehicle relative to each other, the second stereo camera being configured to detect, as a second detection region, the environment outside the vehicle to generate a second outside image,
a third stereo camera including a third pair of cameras that are disposed in the height direction relative to each other, the third pair of cameras being different from the second pair of cameras, the third stereo camera being configured to detect, as a third detection region, the environment outside the vehicle to generate a third outside image, a first image processor configured to perform stereo image processing on a first outside image to determine first image processing information including first distance information, a second image processor configured to perform the stereo image processing on a second outside image to determine second image processing information including second distance information, a third image processor configured to perform the stereo image processing on a third outside image to determine third image processing information including third distance information, and an image controller configured to:
 arrange i) a part of the second detection region associated with the second outside image to overlap a first area of the first detection region associated with the first outside image and ii) a part of the third detection region associated with the third outside image to overlap a second area of the first detection region associated with the first outside image, the first area located along a first side of the first detection region, the second area being located along a second side of the first detection region, the second side being opposite the first side of the first detection region in the width direction of the vehicle;
 perform integration of the first image processing information of the first outside image, the second image processing information of the second outside image, and the third image processing information of the third outside image to recognize a traveling environment of the vehicle; and
 when the image controller detects, in the first area or the second area of the first detection region associated with the first outside image, a loss of the first distance information included in the first image processing information of the first outside image during the integration, compensate the loss of the first image processing information using at least one of the second image processing information of the second outside image and the third image processing information of the third outside image; and a traveling controller configured to control traveling of the vehicle including acceleration, deceleration, and steering, on a basis of the traveling environment recognized by the image controller.

8. A vehicle traveling environment detecting apparatus comprising:

a first camera configured to generate first image data of an environment forward of a vehicle;

a second camera configured to generate second image data of the environment forward of the vehicle, the second camera being disposed in a width direction of the vehicle relative to the first camera;

a third camera configured to generate third image data of the environment forward of the vehicle, the third camera being disposed in a height direction of the vehicle relative to the first camera or to the second camera; and an image controller configured to:
 generate a first outside image of a first detection region of the environment outside of the vehicle based on first stereo image data from a first pair of cameras, wherein the first pair of cameras is selected among the first camera, the second camera, and the third camera;
 generate a second outside image of a second detection region of the environment forward of the vehicle based on second stereo image data from a second pair of cameras, wherein the second pair of cameras is selected among the first camera, the second camera, and the third camera, and wherein the second pair of cameras is different from the first pair of cameras;
 arrange a part of the second detection region associated with the second outside image to overlap a part of the first detection region associated with the first outside image;
 perform integration of first distance information of the first outside image and second distance information of the second outside image; and
 when the image controller detects, in the part of the first detection region associated where the part of the second detection region overlaps, a loss of the first distance information of the first outside image during the integration, compensate the loss of the first distance information using the second distance information of the second outside image.

* * * * *